(12) United States Patent
Magoshi

(10) Patent No.: US 7,870,340 B2
(45) Date of Patent: *Jan. 11, 2011

(54) METHODS AND APPARATUS FOR CONTROLLING HIERARCHICAL CACHE MEMORY

(75) Inventor: Hidetaka Magoshi, Tokyo (JP)

(73) Assignee: Sony Computer Entertainment Inc. (JP)

( * ) Notice: Subject to any disclaimer, the term of this patent is extended or adjusted under 35 U.S.C. 154(b) by 49 days.

This patent is subject to a terminal disclaimer.

(21) Appl. No.: 12/290,141

(22) Filed: Oct. 28, 2008

(65) Prior Publication Data

US 2009/0063772 A1 Mar. 5, 2009

Related U.S. Application Data

(63) Continuation of application No. 11/290,691, filed on Nov. 30, 2005, now Pat. No. 7,461,207, which is a continuation of application No. 10/228,347, filed on Aug. 26, 2002, now Pat. No. 7,024,519.

(60) Provisional application No. 60/378,198, filed on May 6, 2002, provisional application No. 60/382,201, filed on May 21, 2002.

(51) Int. Cl.
*G06F 12/00* (2006.01)
*G06F 13/00* (2006.01)
*G06F 13/28* (2006.01)
(52) U.S. Cl. ............................... 711/122; 711/E12.016
(58) Field of Classification Search .................. 711/122
See application file for complete search history.

(56) References Cited

U.S. PATENT DOCUMENTS 4,037,214 A 7/1977 Birney et al.
4,332,009 A 5/1982 Gerson (Continued)

FOREIGN PATENT DOCUMENTS

EP 0 461 926 A2 12/1991

(Continued)

OTHER PUBLICATIONS

Baer J-L et al., "On The Inclusions Properties For Multi-Level Cache Hierarchies," Proceedings of the Annual International Symposium on Computer Architecture, Honolulu, May 30-Jun. 2, 1988, Washington, IEEE Comp. Soc. Press., vol. Symp. 15, pp. 73-80.

(Continued)

*Primary Examiner*—Sheng-Jen Tsai
(74) *Attorney, Agent, or Firm*—Lerner, David, Littenberg, Krumholz & Mentlik, LLP

(57) ABSTRACT

Methods and apparatus for controlling hierarchical cache memories permit controlling a first level cache memory including a plurality of cache lines and controlling a next lower level cache memory including a plurality of cache lines. An additional memory may be associated with the next lower level cache memory and include a plurality of memory lines, the number of memory lines corresponding to the number of cache lines in a way set of the first level cache memory. Alternatively, the memory lines may include L-flags for multiple cache lines of each way set of the next lower level cache memory. L-flags associated with a given index plus any index offset from the first level cache memory may be contained in a single memory line of the additional memory.

21 Claims, 4 Drawing Sheets

U.S. PATENT DOCUMENTS

| | | |
|---|---|---|
| 4,422,088 A | 12/1983 | Gfeller |
| 4,430,705 A | 2/1984 | Cannavino et al. |
| 4,545,016 A | 10/1985 | Berger |
| 4,589,064 A | 5/1986 | Chiba et al. |
| 4,732,446 A | 3/1988 | Gipson et al. |
| 4,903,234 A | 2/1990 | Sakuraba et al. |
| 4,939,682 A | 7/1990 | Falk |
| 4,954,982 A | 9/1990 | Tateishi et al. |
| 5,144,691 A | 9/1992 | August et al. |
| 5,159,700 A | 10/1992 | Reid et al. |
| 5,216,633 A | 6/1993 | Weon et al. |
| 5,261,066 A | 11/1993 | Jouppi et al. |
| 5,268,973 A | 12/1993 | Jenevein |
| 5,513,337 A | 4/1996 | Gillespie et al. |
| 5,530,832 A | 6/1996 | So et al. |
| 5,551,001 A | 8/1996 | Cohen et al. |
| 5,619,671 A | 4/1997 | Bryant et al. |
| 5,649,154 A | 7/1997 | Kumar et al. |
| 5,671,391 A | 9/1997 | Knotts |
| 5,694,573 A | 12/1997 | Cheong et al. |
| 5,715,248 A | 2/1998 | Lagle, III et al. |
| 5,729,712 A | 3/1998 | Whittaker |
| 5,796,980 A | 8/1998 | Bowles |
| 5,848,435 A | 12/1998 | Brant et al. |
| 5,850,534 A | 12/1998 | Kranich |
| 5,900,019 A | 5/1999 | Greenstein et al. |
| 5,991,858 A | 11/1999 | Weinlander |
| 5,996,048 A | 11/1999 | Cherabuddi et al. |
| 6,035,381 A | 3/2000 | Mita et al. |
| 6,070,233 A | 5/2000 | Whittaker |
| 6,076,149 A | 6/2000 | Usami et al. |
| 6,212,605 B1 | 4/2001 | Arimilli et al. |
| 6,247,094 B1 | 6/2001 | Kumar et al. |
| 6,351,789 B1 | 2/2002 | Green |
| 6,356,980 B1 | 3/2002 | Arimilli et al. |
| 6,467,012 B1 | 10/2002 | Alvarez et al. |
| 6,748,501 B2 | 6/2004 | Arimilli et al. |
| 6,826,662 B2 | 11/2004 | Suzuoki et al. |
| 7,024,519 B2 | 4/2006 | Magoshi |
| 7,461,207 B2 * | 12/2008 | Magoshi .................... 711/122 |
| 2002/0010836 A1 | 1/2002 | Barroso et al. |
| 2003/0154345 A1 | 8/2003 | Lyon |

FOREIGN PATENT DOCUMENTS

| | | |
|---|---|---|
| EP | 0 840 231 A1 | 5/1998 |
| EP | 0 817 080 A2 | 7/1998 |
| JP | 53-073927 | 6/1978 |
| JP | 54-146555 | 11/1979 |
| JP | 56-123051 | 9/1981 |
| JP | 63-019058 | 1/1988 |
| JP | 01-199251 | 8/1989 |
| JP | 5-127992 | 5/1993 |
| JP | 5-216765 | 8/1993 |
| JP | 5-257809 | 10/1993 |
| JP | 5-342101 | 12/1993 |
| JP | 11-039215 | 2/1999 |
| JP | 11-506850 | 6/1999 |
| JP | 11-506852 | 6/1999 |

OTHER PUBLICATIONS

IBM Wins Playstation 3 Contract, BBC News, Mar. 12, 2001.
Jim Handy, "The cache Memory Book: the authoritative reference on cache design," 2nd edition, Academic Press, 1993.

* cited by examiner

METHODS AND APPARATUS FOR CONTROLLING HIERARCHICAL CACHE MEMORY

CROSS REFERENCE TO RELATED APPLICATIONS

The present application is a continuation of U.S. patent application Ser. No. 11/290,691, filed Nov. 30, 2005, entitled METHODS AND APPARATUS FOR CONTROLLING HIERARCHICAL CACHE MEMORY, which is a continuation of U.S. patent application Ser. No. 10/228,347, filed Aug. 26, 2002, and issued on Apr. 4, 2006 as U.S. Pat. No. 7,024,519, which claims the benefit of the filing dates of U.S. Provisional Patent Application No. 60/378,198, filed May 6, 2002, entitled METHODS AND APPARATUS FOR PROVIDING HIERARCHICAL CACHE MEMORY, and U.S. Provisional Patent Application No. 60/382,201, filed May 21, 2002, entitled METHODS AND APPARATUS FOR PROVIDING HIERARCHICAL CACHE MEMORY, the entire disclosures of which are hereby incorporated by reference herein.

BACKGROUND OF THE INVENTION

The present invention relates to methods and apparatus for controlling hierarchical cache memories and, more particularly, to a control technique where storage of data into a cache line of a lower level cache memory is prohibited when such storage would overwrite data of that cache line that is already stored in a higher level cache memory.

In recent years, there has been an insatiable desire for faster computer processing data throughputs because cutting-edge computer applications are becoming more and more complex, and are placing ever increasing demands on microprocessing systems. Conventional microprocessing systems (which employ a microprocessor and an associated memory) have very rapid cycle times (i.e., the unit of time in which a microprocessor is capable of manipulating data), such as one nanosecond. The time required to access data stored in main memory, however, may be considerably longer than the cycle time of the microprocessor. For example, the access time required to obtain a byte of data from a main memory (implemented utilizing dynamic random access memory, DRAM, technology) is on the order of about 60 nanoseconds.

In order to ameliorate the bottleneck imposed by the relatively long access time of DRAM memory, those skilled in the art have utilized cache memories. A cache memory augments the main memory in order to improve the throughput of the system. While the main memory is often implemented utilizing relatively inexpensive, slow, DRAM memory technology, the cache memory is typically implemented utilizing more expensive, fast, static random access memory (SRAM) technology. Given that the cache memory is implemented utilizing a high-cost technology, it is usually of a much smaller size than the main memory.

Due to the relatively small size of cache memories, conventional algorithms have been employed to determine what data should be stored in the cache memory at various times during the operation of the microprocessing system. These conventional algorithms may be based on, for example, the theoretical concept of "locality of reference," which takes advantage of the fact that relatively small portions of an executable program are used by the microprocessor at any particular point in time. Thus, in accordance with the concept of locality of reference, only small portions of the executable program are stored in cache memory at any particular point in time. These or other algorithms may also be employed to control the storage and retrieval of data (which may be used by the executable program) in the cache memory.

The particularities of the known algorithms for taking advantage of locality of reference, or any other concept, for controlling the storage of executable programs and/or data in a cache memory are too numerous to present in this description. Suffice it to say, however, that any given algorithm may not be suitable in all applications as the data processing goals of various applications may differ significantly.

In conventional algorithms for controlling a cache memory, the microprocessor provides data access requests to the cache memory. When the requested data are stored in the cache memory, a cache hit occurs and the microprocessor receives the data relatively quickly. When a data access request for the data cannot be satisfied by accessing the cache memory, i.e., when a cache miss occurs, it is desirable to execute a data refill sequence in which the data is obtained from main memory and stored in the cache memory.

The cache memory may be disposed "on-chip" with the microprocessor, which is called a level-one (L1) cache memory, or it can be disposed separate, or off-chip, from the microprocessor, which is called a level-two (L2) cache memory. L1 cache memories usually have a much faster access time than L2 cache memories. A combined L1, L2 cache memory system also may be formed where both an on-chip cache memory and an off-chip cache memory are employed, which is sometimes referred to as a hierarchical cache memory. In this configuration, when the microprocessor makes an access request for data, the L1 cache memory is accessed first to satisfy the request and, if it cannot be satisfied, the L2 cache memory is accessed. If an L2 cache memory miss occurs, then the main memory is accessed and the L1 and L2 cache memories are refilled.

In order to reduce conflict occurrences between the L1 cache memory and the L2 cache memory, and improve access efficiency, the L2 cache memory may be an N-way set associative memory having more way sets than the L1 cache memory. In accordance with conventional techniques, when the L2 cache memory is refilled (i.e., after an L2 cache memory miss has occurred) one cache line from among N cache lines of the L2 cache memory must be selected to receive the refill data. If one or more of the N cache lines contains invalid data, then the refill data is stored in one of those cache lines. If all N cache lines contain valid data, however, then a random selection technique is used, the well known Leased Recently Used (LRU) algorithm is employed, or any other algorithm is used to select a cache line to receive the refill data. In any case, if valid data is overwritten in a cache line of the L2 cache memory, and a copy of such valid data is also contained in a cache line of the L1 cache memory, then that cache line of the L1 cache memory must be invalidated in order to assure consistency between the L1 cache memory and the L2 cache memory.

Unfortunately, invalidating data in higher level cache memories, such as the L1 cache memory, as dictated by the conventional control technique results in an overall lower throughput for the microprocessing system. Indeed, use of, for example, the L1 cache memory would not be optimized if the data therein were unnecessarily invalidated. This may result in cached instructions or highly accessed data in a loop-body being unnecessarily invalidated, as often happens when a very large data array is accessed.

Accordingly, there are needs in the art for new methods and apparatus for controlling a cache memory, which may include an L1 cache memory, an L2 cache memory and/or further lower level cache memories, in order to improve memory efficiency, increase processing throughput and improve the quality of the overall data processing performed by the system.

SUMMARY OF THE INVENTION

In accordance with one or more aspects of the present invention, an apparatus includes a first level cache memory including a plurality of cache lines, each cache line being operable to store an address tag and data; and a next lower level cache memory including a plurality of cache lines, each cache line being operable to store an address tag, status flags, and data, the status flags of each cache line including an L-flag indicating whether any of the cache lines of the first level cache memory contain a copy of the data stored in that cache line of the next lower level cache memory.

Preferably, the L-flag of each cache line is a single bit, which when true indicates that a corresponding cache line of the first level cache memory contains a copy of the data stored in that cache line of the next lower level cache memory, and which when false indicates that no cache line of the first level cache memory contains a copy of the data stored in that cache line of the next lower level cache memory. For example, the true level of the L-flag bit may be one of a logic high and a logic low, and the false level of the L-flag bit may be the other of the logic high and the logic low.

Preferably, the first level cache memory is an L1 cache memory, and the next lower level cache memory is an L2 cache memory.

The apparatus may further include a processor operable to set the L-flag of a given cache line of the next lower level cache memory to indicate whether or not a corresponding one the of the cache lines of the first level cache memory has been refilled with a copy of the data stored in the given cache line of the next lower level cache memory.

The processor may be alternatively (or additionally) operable to prohibit overwriting data into a given cache line of the next lower level cache memory when the L-flag of the given cache line indicates that a corresponding one the of the cache lines of the first level cache memory contains a copy of the data stored in the given cache line of the next lower level cache memory. Preferably, the processor is further operable to permit overwriting data into a given cache line of the next lower level cache memory when a valid flag of the status flags of the given cache line indicates that any data stored in the given cache line are invalid.

Still further, the processor may be operable to permit overwriting data into a given cache line of the next lower level cache memory when a valid flag of the status flags of the given cache line indicates that data stored in the given cache line are valid and the L-bit of the given cache line indicates that a corresponding one the of the cache lines of the first level cache memory does not contain a copy of the data stored in the given cache line.

The first level cache memory may be a direct mapped cache memory. The next lower level cache memory may be an N-way set associative cache memory.

In accordance with one or more further aspects of the present invention, an apparatus includes: a first level cache memory including a plurality of M1 cache lines, each cache line being operable to store an address tag and data; a next lower level N-way set associative unified cache memory, each of the N-way sets including a plurality of M2 cache lines, each cache line being operable to store an address tag, status flags, and data, and M2 being greater than M1; and an additional memory associated with the next lower level cache memory and including a plurality of M1 memory lines, each memory line including respective L-flags for multiple cache lines of each N way set of the next lower level cache memory, each L-bit indicating whether any of the cache lines of the first level cache memory contain a copy of the data stored in the given cache line of the next lower level cache memory.

Preferably, the number of L-flags in each memory line of the additional memory is equal to M2/M1*N. Each L-flag may be a single bit, which when true indicates that a cache line of the first level cache memory contains a copy of the data stored in an associated cache line of the next lower level cache memory, and which when false indicates that no cache line of the first level cache memory contains a copy of the data stored in the associated cache line of the next lower level cache memory. The true level of the L-flag bit may be one of a logic high and a logic low, and the false level of the L-flag bit may be the other of the logic high and the logic low.

The apparatus preferably includes a processor operable to set the respective L-flags of the additional memory to indicate whether or not corresponding cache lines of the first level cache memory have been refilled with data stored in the cache lines of the next lower level cache memory. Preferably, the processor is further operable to set the L-flags of a given memory line of the additional memory substantially simultaneously.

The processor may alternatively (or additionally) be operable to prohibit overwriting data into a given cache line of the next lower level cache memory when the L-flag of the given cache line indicates that a corresponding one the of the cache lines of the first level cache memory contains a copy of the data stored in the given cache line of the next lower level cache memory. Preferably, the processor is further operable to permit overwriting data into a given cache line of the next lower level cache memory when a valid flag of the status flags of the given cache line indicates that any data stored in the given cache line are invalid. Still further, the processor is preferably operable to permit overwriting data into a given cache line of the next lower level cache memory when a valid flag of the status flags of the given cache line indicates that data stored in the given cache line are valid and the L-flag of the given cache line indicates that a corresponding one the of the cache lines of the first level cache memory does not contain a copy of the data stored in the given cache line.

In accordance with one or more further aspects of the present invention, an apparatus includes: a first level N-way set associative cache memory, each of the N-way sets of the first level cache memory including a plurality of M1 cache lines, each cache line being operable to store an address tag and data; a next lower level N-way set associative unified cache memory, each of the N-way sets of the next lower level cache memory including a plurality of M2 cache lines, each cache line being operable to store an address tag, status flags, and data, and M2 being greater than M1; and an additional memory associated with the next lower level cache memory and including a plurality of M1 memory lines, wherein: each memory line of the additional memory includes respective groups of bits associated with each of the N-way sets of the first level cache memory such that each group of bits of the additional memory is associated with a respective one of the cache lines of the first level cache memory, each group of bits includes an index offset bits, way set bits, and an L-flag, the index offset bits in combination with an index provide a pointer to one cache line of each of the N-way sets of the next lower level cache memory, the way set bits provide a pointer to one of the N-way sets of the next lower level cache memory, and the L-flags indicate whether the associated cache line of the first level cache memory contains a copy of the data stored in the cache line of the next lower level cache memory that is pointed to by the index offset bits, the index, and the way set bits.

In accordance with one or more further aspects of the present invention, a method includes controlling a first level cache memory including a plurality of cache lines, each cache line being operable to store an address tag and data; controlling a next lower level cache memory including a plurality of cache lines, each cache line being operable to store an address tag, status flags, and data, the status flags of each cache line including an L-flag; and setting the L-flag of a given cache line of the next lower level cache memory to indicate whether or not a corresponding one the of the cache lines of the first level cache memory has been refilled with a copy of the data stored in the given cache line of the next lower level cache memory.

The method preferably further includes prohibiting overwriting data into a given cache line of the next lower level cache memory when the L-flag of the given cache line indicates that a corresponding one the of the cache lines of the first level cache memory contains a copy of the data stored in the given cache line of the next lower level cache memory. The method may also include permitting overwriting data into a given cache line of the next lower level cache memory when a valid flag of the status flags of the given cache line indicates that any data stored in the given cache line are invalid. Still further, the method may include permitting overwriting data into a given cache line of the next lower level cache memory when a valid flag of the status flags of the given cache line indicates that data stored in the given cache line are valid and the L-bit of the given cache line indicates that a corresponding one the of the cache lines of the first level cache memory does not contain a copy of the data stored in the given cache line.

In accordance with one or more further aspects of the present invention, a method includes controlling a first level cache memory including a plurality of M1 cache lines, each cache line being operable to store an address tag and data; controlling a next lower level N-way set associative unified cache memory, each of the N-way sets including a plurality of M2 cache lines, each cache line being operable to store an address tag, status flags, and data, and M2 being greater than M1; controlling an additional memory associated with the next lower level cache memory and including a plurality of M1 memory lines, each memory line including respective L-flags for multiple cache lines of each N way set of the next lower level cache memory; and setting the respective L-flags of the additional memory to indicate whether or not corresponding cache lines of the first level cache memory have been refilled with data stored in the cache lines of the next lower level cache memory.

In accordance with one or more further aspects of the present invention, a method includes controlling a first level N-way set associative cache memory, each of the N-way sets of the first level cache memory including a plurality of M1 cache lines, each cache line being operable to store an address tag and data; controlling a next lower level N-way set associative unified cache memory, each of the N-way sets of the next lower level cache memory including a plurality of M2 cache lines, each cache line being operable to store an address tag, status flags, and data, and M2 being greater than M1; controlling an additional memory associated with the next lower level cache memory and including a plurality of M1 memory lines, wherein (i) each memory line of the additional memory includes respective groups of bits associated with each of the N-way sets of the first level cache memory such that each group of bits of the additional memory is associated with a respective one of the cache lines of the first level cache memory, (ii) each group of bits includes an index offset bits, way set bits, and L-flag, (iii) the index offset bits in combination with an index provide a pointer to one cache line of each of the N-way sets of the next lower level cache memory, and (iv) the way set bits provide a pointer to one of the N-way sets of the next lower level cache memory; and setting the respective L-flags of the additional memory to indicate whether or not corresponding cache lines of the first level cache memory have been refilled with data stored in the cache lines of the next lower level cache memory that are pointed to by the index offset bits, the index, and the way set bits.

In accordance with one or more further aspects of the present invention, the methods and apparatus for controlling cache memories described thus far and/or described later in this document, may be achieved utilizing suitable hardware, such as that shown in the drawings hereinbelow. Such hardware may be implemented utilizing any of the known technologies, such as standard digital circuitry, analog circuitry, any of the known processors that are operable to execute software and/or firmware programs, one or more programmable digital devices or systems, such as programmable read only memories (PROMs), programmable array logic devices (PALs), any combination of the above, etc.

In accordance with another aspect of the invention, an apparatus is provided. The apparatus comprises a first level cache memory, a next lower level cache memory and an additional memory. The first level cache memory includes a plurality of way sets and a plurality of cache lines associated therewith. Each cache line of the first level cache memory is operable to store an address tag and data. The next lower level cache memory includes a plurality of way sets and a plurality of cache lines associated therewith. Each cache line of the next lower level cache memory is operable to store an address tag, status flags, and data. The additional memory is associated with the next lower level cache memory and includes a plurality of memory lines, wherein the number of memory lines corresponds with the number of cache lines contained in a given way set of the first level cache memory.

In one alternative, the number of memory lines in the additional memory is equal to the number of cache lines contained in a given way set of the first level cache memory. In another alternative, there are N way sets in the first level cache memory, there are M way sets in the second level cache memory, and M>N. In this case, N may be, e.g., 2 and M may be, e.g., 8. In a further alternative, each memory line of the additional memory includes respective L-flags for multiple cache lines of each way set of the next lower level cache memory, and each L-bit flag indicates whether any of the cache lines of the first level cache memory contains a copy of the data stored in a given cache line of the next lower level cache memory.

In yet another alternative, each cache line of the first level cache memory has an index associated therewith, each memory line of the additional memory includes respective L-flags for multiple cache lines of each way set of the next lower level cache memory, and all L-flags associated with a given one of the indices plus any index offset from the first level cache memory are contained in a single memory line of the additional memory. In one example, all of the L-flags associated with the given index are operable to be controlled at the same time. In another example, all of the L-flags associated with the given index are operable to be changed at the same time. Optionally, in any of these cases, the apparatus may further comprise a processor operable to set the respective L-flags of the additional memory to indicate whether or not corresponding cache lines of the first level cache memory have been refilled with data stored in the cache lines of the next lower level cache memory. Here, the processor is preferably further operable to set the L-flags of a given memory line of the additional memory substantially simultaneously.

In another alternative, each way set in the second level cache memory is larger than each way set in the first level cache memory. In this case, each way set in the second level cache memory may be at least four times larger than each way set in the first level cache memory. Optionally, the apparatus further comprises a first index for accessing the first level cache memory and a second index for accessing the next lower level cache memory, wherein the first index requires a fewer number of bits to access the first level cache memory than the second index requires to access the next lower level cache memory.

In yet another alternative, the apparatus further comprises an address bus logically associated with the first level cache memory and the next lower level cache memory. When a cache miss occurs in the first level cache memory, an effective address is passed to the next lower level cache memory over the address bus, a first set of bits in the address bus contains tag bits of the effective address, and a second set of bits in the address bus contains index bits of the effective address. In this case, the next lower level cache memory preferably utilizes the second set of bits and at least some of the first set of bits to access selected ones of the cache lines in at least a selected one of the way sets.

In accordance with a further embodiment of the present invention, an apparatus is provided with a first level cache memory, a next lower level cache memory and an additional memory associated with the next lower level cache memory. The first level cache memory includes a plurality of way sets and a plurality of cache lines associated therewith. Each cache line of the first level cache memory is operable to store an address tag and data, and each cache line has an index associated therewith. The next lower level cache memory includes a plurality of way sets and a plurality of cache lines associated therewith. Each cache line of the next lower level cache memory is operable to store an address tag, status flags, and data. The additional memory includes a plurality of memory lines. Each memory line of the additional memory includes respective L-flags for multiple cache lines of each way set of the next lower level cache memory, and all L-flags associated with a given one of the indices plus any index offset from the first level cache memory are contained in a single memory line of the additional memory.

In one alternative, the first level cache memory is a direct mapped cache. In another alternative, the first level cache memory is an L1 cache memory, and the next lower level cache memory is an L2 cache memory. In a further alternative, all of the L-flags associated with the given one of the indices are operable to be controlled or changed at the same time.

A method is provided in accordance with another embodiment of the present invention. The method comprises controlling a first level cache memory including a plurality of way sets and a plurality of cache lines associated therewith, each cache line of the first level cache memory being operable to store an address tag and data; controlling a next lower level cache memory including a plurality of way sets and a plurality of cache lines associated therewith, each cache line of the next lower level cache memory being operable to store an address tag, status flags, and data; controlling an additional memory associated with the next lower level cache memory and including a plurality of memory lines, each memory line of the additional memory including respective L-flags for multiple cache lines of each way set of the next lower level cache memory, each L-bit flag indicating whether any of the cache lines of the first level cache memory contains a copy of the data stored in a given cache line of the next lower level cache memory; and setting the respective L-flags of the additional memory to indicate whether or not corresponding cache lines of the first level cache memory have been refilled with data stored in the cache lines of the next lower level cache memory; wherein the number of memory lines is equal to the number of cache lines contained in a given way set of the first level cache memory.

In one alternative, when a cache miss occurs in the first level cache memory, the method further comprises passing an effective address to the next lower level cache memory over an address bus. A first set of bits in the address bus contains tag bits of the effective address and a second set of bits in the address bus contains index bits of the effective address. In this case, the method desirably further comprises identifying selected ones of the cache lines in at least one of the way sets in the next lower level cache memory from the second set of bits and at least some of the first set of bits.

A method is provided in accordance with a further embodiment of the present invention. The method comprises controlling a first level cache memory including a plurality of way sets and a plurality of cache lines associated therewith, each cache line of the first level cache memory being operable to store an address tag and data, and each cache line having an index associated therewith; controlling a next lower level cache memory including a plurality of way sets and a plurality of cache lines associated therewith, each cache line of the next lower level cache memory being operable to store an address tag, status flags, and data; controlling an additional memory associated with the next lower level cache memory and including a plurality of memory lines, each memory line of the additional memory including respective L-flags for multiple cache lines of each way set of the next lower level cache memory, and all L-flags associated with a given one of the indices plus any index offset from the first level cache memory are contained in a single memory line of the additional memory; and setting the respective L-flags of the additional memory to indicate whether or not corresponding cache lines of the first level cache memory have been refilled with data stored in the cache lines of the next lower level cache memory.

In an alternative, when a cache miss occurs in the first level cache memory, the method further comprises passing an effective address to the next lower level cache memory over an address bus. A first set of bits in the address bus contains tag bits of the effective address and a second set of bits in the address bus contains index bits of the effective address. In this case, the method preferably further comprises identifying selected ones of the cache lines in at least one of the way sets in the next lower level cache memory from the second set of bits and at least some of the first set of bits.

In accordance with another embodiment of the present invention, an apparatus is provided which comprises a first level cache memory, a next lower level cache memory and an additional memory. The first level cache memory includes a plurality of way sets and a plurality of cache lines associated therewith. Each cache line of the first level cache memory is operable to store an address tag and data. The next lower level cache memory includes a plurality of way sets and a plurality of cache lines associated therewith. Each cache line of the next lower level cache memory is operable to store an address tag, status flags, and data. The additional memory is associated with the next lower level cache memory and includes a plurality of memory lines. The number of memory lines corresponds with the number of cache lines contained in a given way set of the first level cache memory. The additional memory is separate from the next lower level cache memory. Each cache line of the first level cache memory has an index associated therewith. Each memory line of the additional memory includes respective L-flags for multiple cache lines of each way set of the next lower level cache memory. All L-flags associated with a given one of the indices plus any index offset from the first level cache memory are contained in a single memory line of the additional memory. And the next lower level cache memory does not include an L-flag contained within each cache line thereof.

In one example, the plurality of cache lines of the first level cache memory are addressed by way of effective addresses. In an alternative, the effective addresses are issued by a microprocessor controlling operation of the apparatus. In another alternative, each effective address for a respective one of the cache lines of the first level cache memory includes a tag and the respective index. In this case, the respective index preferably provides a pointer to a particular cache line of the first level cache memory. For instance, when a cache miss occurs in the first level cache memory, a respective effective address is passed to the next lower level cache memory over an address bus. Here, a first set of bits in the address bus contain the tag of the respective effective address and a second set of bits in the address bus contain the index of the respective effective address.

In a further example, the states of the respective L-flags are controlled as a function of the data stored in the first level cache memory.

In accordance with an alternative embodiment of the present invention, an apparatus is provided which comprises a first level cache memory, a next lower level cache memory and an additional memory. The first level cache memory includes a plurality of way sets and a plurality of cache lines associated therewith. Each cache line of the first level cache memory is operable to store an address tag and data. The next lower level cache memory includes a plurality of way sets and a plurality of cache lines associated therewith. Each cache line of the next lower level cache memory is operable to store an address tag, status flags, and data. The additional memory is associated with the next lower level cache memory and includes a plurality of memory lines. The number of memory lines corresponds with the number of cache lines contained in a given way set of the first level cache memory. Each cache line of the first level cache memory has an index associated therewith. Each memory line of the additional memory includes respective L-flags for multiple cache lines of each way set of the next lower level cache memory. And all L-flags associated with a given one of the indices plus any index offset from the first level cache memory are contained in a single memory line of the additional memory so that all of the L-flags associated with the given index plus any index offset are controlled at the same time.

In one example, the plurality of cache lines of the first level cache memory are addressed by way of effective addresses. In an alternative, the effective addresses are issued by a microprocessor controlling operation of the apparatus. In another alternative, each effective address for a respective one of the cache lines of the first level cache memory includes a tag and the respective index. In this case, the respective index preferably provides a pointer to a particular cache line of the first level cache memory. Thus, by way of example, when a cache miss occurs in the first level cache memory, a respective effective address is passed to the next lower level cache memory over an address bus, a first set of bits in the address bus contains the tag of the respective effective address and a second set of bits in the address bus contains the index of the respective effective address.

In a further example, the states of the respective L-flags are controlled as a function of the data stored in the first level cache memory.

In accordance with yet another embodiment of the present invention, an apparatus is provided which comprises a first level cache memory, a next lower level cache memory and an additional memory. The first level cache memory includes a plurality of way sets and a plurality of cache lines associated therewith. Each cache line of the first level cache memory is operable to store an address tag and data. The next lower level cache memory includes a plurality of way sets and a plurality of cache lines associated therewith. Each cache line of the next lower level cache memory is operable to store an address tag, status flags, and data. The additional memory is associated with the next lower level cache memory and including a plurality of memory lines. The number of memory lines corresponds with the number of cache lines contained in a given way set of the first level cache memory. Each cache line of the first level cache memory has an index associated therewith. Each memory line of the additional memory includes respective L-flags for multiple cache lines of each way set of the next lower level cache memory. All L-flags associated with a given one of the indices plus any index offset from the first level cache memory are contained in a single memory line of the additional memory. And when the next lower level cache memory is refilled, data of the first level cache memory is not invalidated.

In one example, the plurality of cache lines of the first level cache memory are addressed by way of effective addresses. In this case, each effective address for a respective one of the cache lines of the first level cache memory preferably includes a tag and the respective index. In an alternative, the respective index provides a pointer to a particular cache line of the first level cache memory. Thus, when a cache miss occurs in the first level cache memory, a respective effective address is preferably passed to the next lower level cache memory over an address bus, a first set of bits in the address bus contains the tag of the respective effective address and a second set of bits in the address bus contains the index of the respective effective address.

In another example, the states of the respective L-flags are controlled as a function of the data stored in the first level cache memory.

And in yet another example, if writing to a given cache line of the next lower level cache memory is prohibited due to the status of a respective L-flag associated with the given cache line, than refill data is refilled into any of the other cache lines of the next lower level cache memory indexed by the same index and index offset.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the invention, there are shown in the drawings forms that are presently preferred, it being understood, however, that the invention is not limited to the precise arrangements and instrumentalities shown.

DETAILED DESCRIPTION

Figure 1:
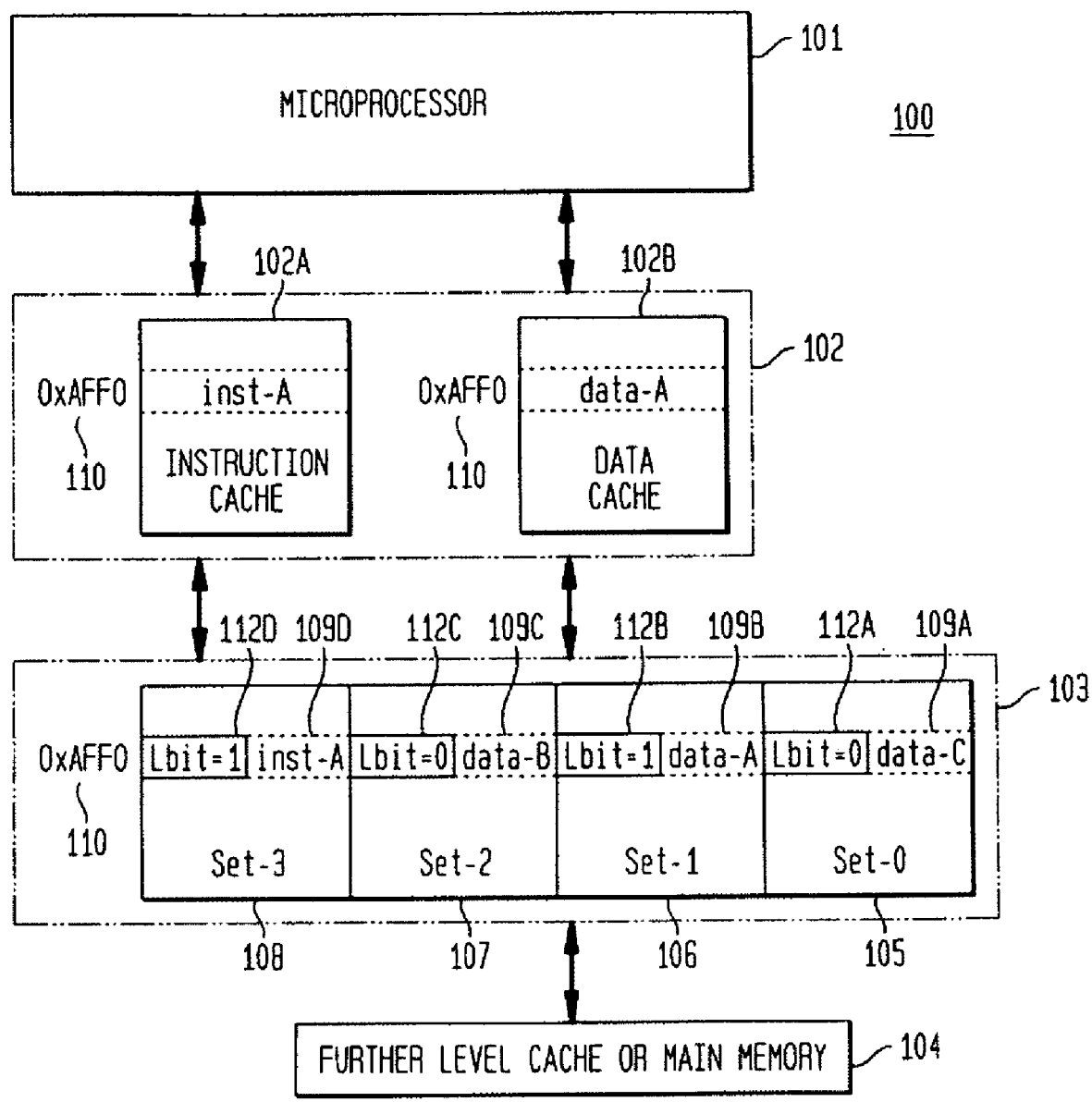
FIG. 1 is a block diagram showing aspects of one or more methods and apparatus suitable for controlling a hierarchical cache memory in accordance with one or more embodiments of the present invention.

With reference to the drawings, wherein like numerals indicate like elements, there is shown in FIG. 1 a block diagram illustrating one or more aspects of the present invention. For the purposes of brevity and clarity, the block diagram of FIG. 1 will be referred to and described herein as illustrating an apparatus 100, it being understood, however, that the description may be readily applied to various aspects of one or more methods with equal force.

The apparatus 100 preferably represents a microprocessor system including a microprocessor 101, a first level cache memory 102, a lower level cache memory 103, and a further memory 104. The microprocessor 101 may be implemented utilizing any of the known microprocessor devices presently available or hereinafter developed.

The first level cache memory 102 is preferably an L1 cache memory, i.e., disposed on-chip with the microprocessor 101. It is noted, however, that although it is preferred that the first level cache memory 102 is disposed on-chip with the microprocessor 101, is not necessary that the first level cache memory 102 is implemented on-chip. Indeed, the first level cache memory 102 may be disposed off-chip from the microprocessor 101.

Preferably, the first level cache memory 102 includes an instruction cache memory 102A and a separate data cache memory 102B, each containing a plurality of cache lines. Each cache line includes an address tag, status flags, and data. Separate instruction and data caches are preferably utilized in order to avoid access conflicts. By way of example, each of the instruction and data cache memories 102A, 102B may be implemented in a direct mapped configuration of 64 K bytes in size. It is noted, however, that the instruction cache memory 102A and the data cache memory 102B may be of any size. It is also noted that the first level cache memory 102 may alternatively contain a single, direct mapped cache memory containing both instructions and data.

The cache lines of the instruction and data cache memories 102A, 102B are addressed by way of effective addresses issued by the microprocessor 101, where each effective address includes tag bits and index bits. The index bits provide a pointer to a particular cache line of the instruction cache memory 102A and/or the data cache memory 102B of the first level cache memory 102. In keeping with the above example of 64 K byte cache memory sizes, the index bits may range from 0x0000 to 0xFFFF (some of the least significant bits are used as an offset) in order to point to any of the available cache lines. As an illustrative example, a pointer (or index) 110 derived from the index bits of the effective address from the microprocessor 101 is shown as being 0xAFF0, which points to a cache line of the instruction cache memory 102A containing inst-A, and which points to a cache line of the data cache memory 102B containing data-A.

The lower level cache memory 103, which in this embodiment is an L2 cache memory, is preferably an N-way set associative memory, where N=4. Thus, the lower level cache memory 103 includes a first way set 105, a second way set 106, a third way set 107, and a fourth way set 108. Each way set of the lower level cache memory 103 preferably includes a plurality of cache lines, each cache line being operable to store an address tag, status flags, and data (which may include instructions). In this illustrative embodiment of the invention, the lower level cache memory 103 is preferably 256 K bytes in size, where each way set is 64 K bytes in size. Thus, each cache line of the instruction and data cache memories 102A, 102B of the first level cache memory 102 corresponds with a respective cache line from each of the four way sets 105, 106, 107, 108 of the lower level cache memory 103. In keeping with the example above, the pointer 110 (having an index value of 0xAFF0) points to four cache lines of the lower level cache memory 103, one cache line from each of the way sets 105, 106, 107, and 108.

The status flags of each cache line of the lower level cache memory 103 preferably include an L-flag 112 indicating whether any of the cache lines of the first level cache memory 102 contain a copy of the data stored in the given cache line of the next lower level cache memory 103. It is noted that each L-flag may be comprised of one or more bits, where a single bit is most preferred. Although any convention may be employed in accordance with the invention, by way of example, when the L-flag (or bit) 112 is "true" it preferably indicates that a corresponding cache line of the first level cache memory 102 contains a copy of the data stored in the given cache line of the lower level cache memory 103. Conversely, when the L-flag 112 is "false" it preferably indicates that no cache line of the first level cache memory 102 contains a copy of the data stored in the given cache line of lower level cache memory 103. When the L-flag 112 is a single bit, then one of a logic high and a logic low preferably represents a true state, while the other of the logic high and the logic low represents a false state.

As an example, cache line 109A of way set 105 (indexed by 0xAFF0) contains an L-bit 112A at a logic low (false) level indicating that the data of that cache line, data-C, is not contained in the cache line of the data cache memory 102B indexed by 0xAFF0. Cache line 109B of the lower level cache memory 103 contains an L-bit 112B at a logic high (true) state indicating that the data of that cache line, data-A, is contained in the cache line of the data cache memory 102B of the first level cache memory 102 indexed by 0xAFF0. Cache line 109C of the lower level cache memory 103 includes an L-bit 112C at a logic low (false) state indicating that the data of that cache line, data-B, is not contained in the cache line of the data cache memory 102B indexed by 0xAFF0. And cache line 109D contains a L-bit 112D at a logic high (true) state indicating that the data of that cache line, inst-A, is contained in the cache line of the instruction cache memory 102A indexed by 0xAFF0.

The further memory 104 may be a next lower level cache memory or main memory. Indeed, the invention contemplates any number of hierarchical cache memories between the microprocessor 101 and main memory.

Figure 2:
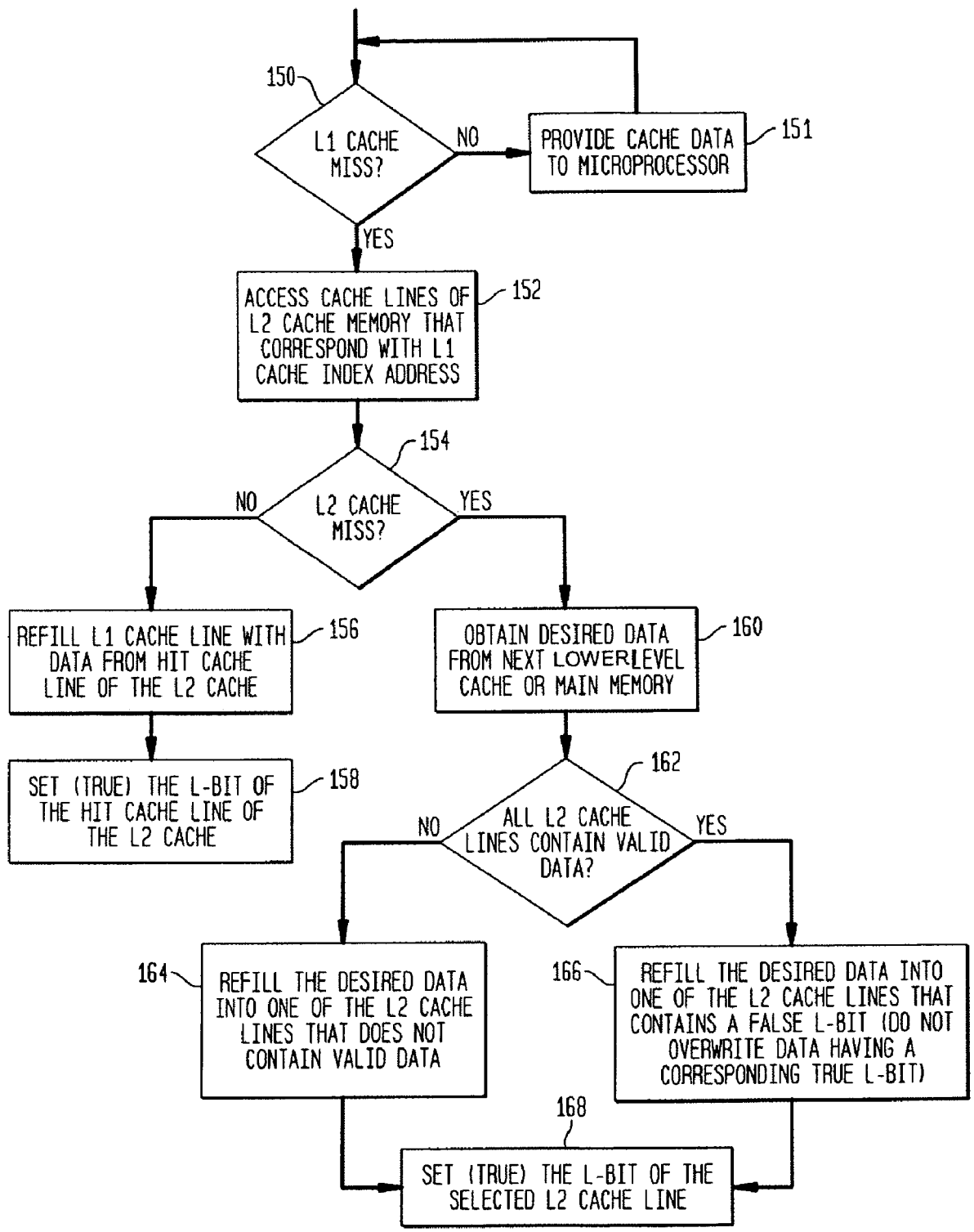
FIG. 2 is a flow diagram illustrating certain actions/functions that may be carried out and/or implemented in accordance with one or more of the embodiments of the present invention.

The structure and operation of the apparatus 100 will be better understood with further reference to FIG. 2, which is a flow diagram illustrating certain actions carried out by, or in association with, the apparatus 100. For the purposes of discussion, it is assumed that the first level cache memory 102 is an L1 cache memory, the lower level cache memory 103 is an L2 cache memory, and the further memory 104 is main memory.

According to one or more aspects of the methods and apparatus illustrated in FIGS. 1 and 2, the states of the respective L-flags 112 are controlled as a function of the data (or instructions) stored in the first level cache memory 102. The L-flags 112 are used to determine whether to permit or prohibit the storage of data or instructions in the cache lines of the lower level cache memory 103. More particularly, the L-flag 112 of a given cache line of the lower level cache memory 103 is preferably set true or false to indicate whether or not a corresponding one of the cache lines of the first level cache memory 102 has been refilled with a copy of the data stored in the given cache line of the lower level cache memory 103.

Turning to FIG. 2, this general control is illustrated in more detail. At action 150, a determination is made as to whether an L1 cache hit or miss has occurred. When a cache hit occurs, the process flow advances to action 151, where the requested data are retrieved from the first level cache memory 102 and provided to the microprocessor 101. When it is determined that a cache miss has occurred, the process flow advances to action 152. By way of example, assume that the microprocessor 101 issues an access request to the first level cache memory 102 (the L1 cache memory) requesting data-C from the cache line of the data cache memory 102B indexed by 0xAFF0. A cache miss will occur when either one of the status flags (e.g., a valid flag or bit) of that cache line shows that the data contained therein is invalid, or when the address tag of that cache line does not match the tag bits of the effective address (as would the case if the data contained in that cache line were not data-C).

At action 152, the cache lines 109A, 109B, 109C, and 109D of the lower level cache memory 103 that are indexed by 0xAFF0 are accessed to determine whether (i) any of the address tags thereof match the tag bits of the effective address; and (ii) whether the valid flag of any cache line containing an address tag that matches the tag bits indicates that such data are valid. If either of these conditions is not met, then the L2 cache memory 103 cannot satisfy the access request and an L2 cache miss will have occurred (action 154). Since cache line 109A contains valid data, namely, data-C, the data requested by the L1 cache memory (and the microprocessor 101) results in an L2 cache memory hit, which causes the process flow to advance from action 154 to action 156.

At action 156, the cache line of the data cache memory 102B of the L1 cache memory 102 is refilled with the data contained in cache line 109A of the L2 cache memory 103. More particularly, the cache line of the data cache memory 102B indexed by 0xAFF0, which contains data-A, is overwritten with the refill data, data-C, contained in cache line 109A of the L2 cache memory 103. The process flow then advances to action 158, where the L-bit 112A of cache line 109A of the L2 cache memory 103 is set true. This indicates that the corresponding cache line of the data cache memory 102B contains a copy of data of cache line 109A. Further, the L-bit 112B of cache line 109B is set false, which indicates that the data contained in the corresponding cache line of the data cache memory 102B no longer contains a copy of the data (i.e., data-A) contained in cache line 109B.

In the above example, the access request by the microprocessor 101 missed the L1 cache memory 102 and the resulting access request by the L1 cache memory 102 hit the L2 cache memory 103. A scenario will now be discussed in which the access request by the microprocessor 101 misses the L1 cache memory 102 and the access request by the L1 cache memory 102 misses the L2 cache memory 103. More particularly, it is assumed that the microprocessor 101 presents an access request to the L1 cache memory 102 for data-D indexed at 0xAFF0. At action 150, an L1 cache memory miss occurs and the process advances to action 152. At action 152, cache lines 109A-D indexed by 0xAFF0 are accessed and the process flow advances to action 154. At action 154, an L2 cache memory miss occurs because none of the cache lines 109A-D indexed by 0xAFF0 contain data-D. The process flow then advances to action 160. There, the desired data, data-D, is obtained either from a next lower level cache memory or main memory. For the purposes of this example, it is assumed that the further memory 104 is main memory and, thus, the desired data is obtained from main memory. The process flow then advances to action 162 where a data refill sequence commences.

Prior to discussing the details of action 162, it is noted that, in accordance with one or more aspects of the present invention, it is desirable to permit the overwriting of data into any cache line of the L2 cache memory 103 that contains invalid data (i.e., the valid flag of a given cache line indicates that any data stored in the given cache line are invalid). Assuming that all cache lines of the L2 cache memory 103 indexed by a particular pointer 110, such as cache lines 109A-D, contain valid data, the overwriting of data into a given cache line of the L2 cache memory 103 is preferably prohibited when the L-flag of the given cache line indicates that a corresponding one of the cache lines of the L1 cache memory 102 contains a copy of the data stored in the given cache line of the L2 cache memory 103. Further details in this regard are illustrated in actions 162-168 of FIG. 2.

At action 162, a determination is made as to whether all cache lines of the L2 cache memory 103 (indexed by 0xAFF0) contain valid data. If one or more of the cache lines of the L2 cache memory 103 contain invalid data, then the process flow preferably branches to action 164 where the desired data, data-D, is overwritten into one of such cache lines. In this example, however, it is assumed that each of the cache lines of the L2 cache memory 103 contains valid data and, therefore, the determination at action 162 results in the process flow branching to action 166. At action 166, the desired data, data-D, is overwritten only into one of the cache lines in which the corresponding L-flag (or L-bit) 112 is false. In other words, a cache line of the L2 cache memory 103 is prohibited from being overwritten when the L-flag 112 indicates that the corresponding cache line of the L1 cache memory 102 contains a copy of the data contained in such cache line of the L2 cache memory 103. Thus, for example, the desired data, data-D, may be overwritten to cache line 109A or 109C because the respective L-bits 112A, 112C of those cache lines are false. Assuming that the data of cache line 109C of the L2 cache memory 103 is overwritten, the L-bit 112C is set true (action 168) and a copy of data-D is also refilled into the corresponding cache line of the data cache memory 102B of the L1 cache memory 102.

Advantageously, when the L2 cache memory 103 is refilled, there is no need to invalidate any data of the L1 cache memory 102. Thus, improved memory efficiency, increased processing throughput, and improved quality of data processing are achieved.

Figure 3:
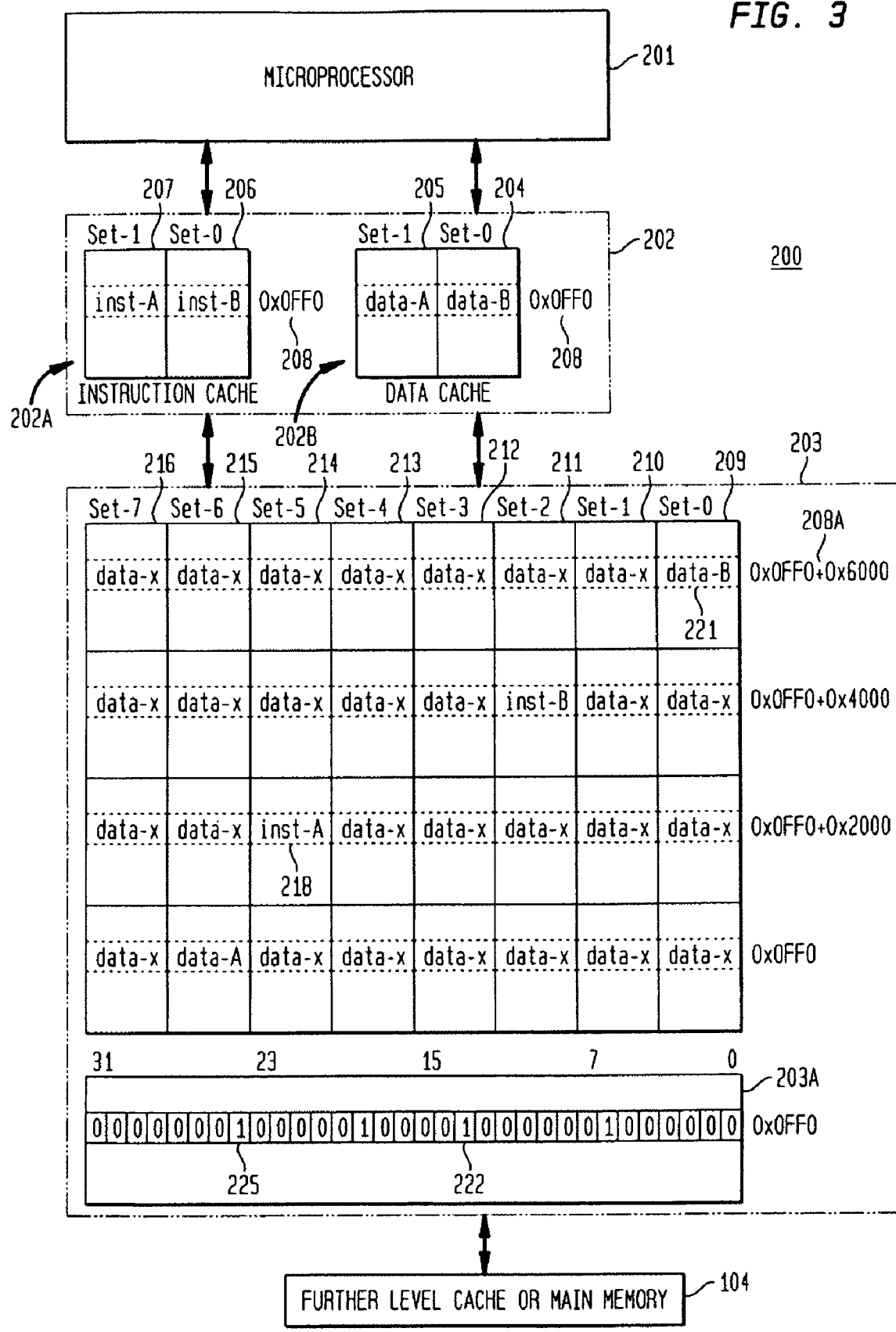
FIG. 3 is a block diagram showing further aspects of one or more alternative methods and apparatus suitable for controlling a hierarchical cache memory in accordance with one or more further embodiments of the present invention.

Reference is now made to FIG. 3, which is a block diagram illustrating further aspects and embodiments of the present invention. Again, for the purposes of brevity and clarity, the block diagram of FIG. 3 will be referred to, and described herein, as illustrating an apparatus 200, it being understood, however, that the description may be readily applied to various aspects of one or more methods with equal force. The apparatus 200 preferably represents a microprocessor system including a microprocessor device 201, a first level cache memory 202, a next lower level cache memory 203, and a further memory 104.

The first level cache memory 202 preferably includes an instruction cache memory 202A and a separate data cache memory 202B, it being understood, however, that the invention contemplates other implementations where a unified instruction and data cache memory is employed. In any event, each of the instruction cache memory 202A and the data cache memory 202B is preferably implemented by way of an N-way set associative cache memory implementation, where N=2. Thus, the data cache memory 202B includes a way set 204 and a way set 205, and the instruction cache memory 202A includes a way set 206 and a way set 207. Each way set 204-207 of the instruction cache memory 202A and the data cache memory 202B is preferably 8 K bytes in size, and each cache line thereof preferably is operable to store an address tag, status flags, and data (which may include instructions). Thus, a given index (or pointer) 208 may take on values between 0x0000 and 0x1FFF (13 bits) to index every cache line of way sets 204, 205, 206, and 207. By way of illustration, the pointer 208 has a value of 0x0FF0 and points to one cache line of each way set 204, 205, 206, and 207.

The next lower level cache memory 203 is preferably also an N-way set associative cache memory, where N=8. Thus, the next lower level cache memory 203 includes way set 209, way set 210, way set 211, way set 212, way set 213, way set 214, way set 215, and way set 216. These way sets may also be referred to herein as Set-0, Set-1, Set-2, Set-3, Set-4, Set-5, Set-6, and Set-7. In accordance with this embodiment of the invention, each way set 209-216 of the next lower level cache memory 203 is preferably larger than each way set 204-207 of the first level cache memory 202. By way of example, each way set 209-216 of the next lower level cache memory 203 is preferably 32 K bytes in size. Thus, each way set 209-216 of the next lower level cache memory 203 is four times larger than each way set 204-207 of the first level cache memory 202.

It is noted that an index (or pointer) 208A requires 15 bits ranging from 0x0000 to 0x7FFF in order to access every cache line of the next lower level cache memory 203. Recall, however, that the pointer 208 only requires 13 bits ranging from 0x0000 to 0x1FFF to access every cache line of the first level cache memory 202. In a practical system, this apparent discrepancy works out as follows. When a cache miss occurs in the first level cache memory 202, the effective address passes to the next lower level cache memory 203 over an address bus. The address bus may, for example, include 32 bits [31:0]. Thus, as issued by the first level cache memory 202, bits [31:13] of the address bus contains the tag bits of the effective address and bits [12:0] of the address bus contains the index bits of the effective address. The effective address thus passes from the first level cache memory 202 to the next lower level cache memory 203.

The next lower level cache memory 203, however, treats bits [14:0] of the address bus as containing the index bits for the pointer 208A to the eight cache lines of interest. Thus, bits [14:13] of the address bus, which contain a portion of what the first level cache memory 202 treated as the tag bits, are used by the next lower level cache memory 203 as part of the index bits or pointer 208A. When bits [14:13] of the address bus are 00, then the pointer 208A contains an index of 0x0FF0 and points to a lower eight cache lines of way sets 209-216. When bits [14:13] of the address bus are 01, then the pointer 208A contains an index of 0x0FF0+0x2000 and points to a higher eight cache lines of way sets 209-216. Similarly, when bits [14:13] of the address bus are 10, then the pointer 208A contains an index of 0x0FF0+0x4000 and points to a next higher eight cache lines of way sets 209-216. Lastly, when bits [14:13] of the address bus are 11, then the pointer 208A contains an index of 0x0FF0+0x6000 and points to a still higher eight cache lines of way sets 209-216. Thus, bits [14:13] of the address bus may be considered an index offset, which in this example may take on a value from among 0x0000, 0x2000, 0x4000, and 0x6000.

Each cache line of the next lower level cache memory 203 is preferably operable to store an address tag, status flags, and data (which may include instructions). Unlike the embodiment of the invention illustrated in FIG. 1, however, the apparatus 200 of FIG. 3 preferably does not include an L-flag contained within each cache line of the next lower level cache memory 203. This is so because, if each cache line included an L-flag, it would be impossible to control or change the values of respective L-flags located in cache lines indexed using differing index offsets. Indeed, only eight cache lines, all at the same index offset, may be manipulated at one time.

In accordance with this embodiment of the present invention, the apparatus 200 preferably includes an additional memory 203A, which may be integral with, or separate from, the next lower level cache memory 203. The additional memory 203A preferably includes a plurality of memory lines, where the number of memory lines corresponds with the number of cache lines contained in a given way set of the first level cache memory 202. Thus, in the example illustrated in FIG. 3, the additional memory 203A preferably includes 8 K byte memory lines. Each memory line of the additional memory 203A preferably includes respective L-flags for multiple cache lines of each way set 209-216 of the next lower level cache memory 203. In this example, each memory line includes an L-flag for each of four cache lines for each way set 209-216, totaling 32 L-flags. More generally, the number of L-flags in each memory line of the additional memory 203A is equal to M2/M1*N, where N is the number of way sets in the first level cache memory 202, M1 is the number of cache lines in each way set of the first level cache memory 202 and M2 is the number of cache lines in each way set of the next lower level cache memory 203. In this way, all L-flags associated with a given index plus any index offset from the first level cache memory 202 are contained in a single memory line of the additional memory 203A. Therefore, all such L-flags may be controlled or changed at the same time.

The operation of the apparatus 200 of FIG. 3 will now be described further by way of an example. The microprocessor 201 issues an effective address (or access request) to the first level cache memory 202 by way of, for example, a 32 bit address bus. For the purposes of this example, it is assumed that the microprocessor 201 requests data-C, which is not stored in either of the first level cache memory 202 or the next lower level cache memory 203. Bits [31:13] of the address bus thus contain tag bits corresponding to the data (data-C) requested by the microprocessor 201. Bits [12:0] of the address bus contain index bits, which are used to point to respective cache lines of the way sets 204-207 of the first level cache memory 202. In this example, the index bits are 0x0FF0 and, thus, the pointer 208 accesses two cache lines of the instruction cache memory 202A (containing inst-A and inst-B) and two cache lines of the data cache memory 202B (containing data-A and data-B). Since neither of the two accessed cache lines of the data cache memory 202B contain data-C, a cache miss occurs.

Due to the cache miss, the first level cache memory 202 passes the effective address to the lower level cache memory 203 such that an attempt may be made to satisfy the data access request in that cache memory. While the first level cache memory 202 used bits [12:0] of the address bus for the index of the effective address, the next lower level cache memory 203 treats bits [14:0] of the address bus as containing the index bits of the effective address. For the purposes of this example, it is assumed that bits [14:13] of the address bus are 01, which corresponds to an index offset of 0x2000. Thus, the pointer 208A takes on a value of 0x0FF0+0x2000 and points to the corresponding eight cache lines from way sets 209-216 of the lower level cache memory 203.

Since none of the eight accessed cache lines of the lower level cache memory 203 contain data-C, a cache miss occurs. Thus, the lower level cache memory 203 passes the effective address to the further memory 104 (which may be one or more further cache memories and/or main memory). Thereafter, data-C are returned for refill into the respective cache memories 202, 203.

A determination is made as to which cache line (indexed by 0x0FF0+0x2000) of the lower level cache memory 203 will receive the refill data, data-C. If one or more of these cache lines of the lower level cache memory 203 contains invalid data, then the refill data is preferably overwritten into one of such cache lines. In this example, however, it is assumed that each of these cache lines of the lower level cache memory 203 contains valid data (i.e., the respective valid flags of the cache lines indicate all data are valid). Thus, a determination is preferably made as to whether one or more of the cache lines contain data that are not cached in the first level cache memory 202 and, if so, the refill data are stored in one of those cache lines.

To that end, the memory line of the additional memory 203A indexed by 0x0FF0 (with no offset) is accessed. This memory line, as is the case with all of the memory lines, contains 32 L-flags, which in this example comprise a single bit. A true bit (logic high) indicates that the data of the associated cache line of the lower level cache memory 203 is also cached in the first level cache memory 202. A false (logic low) level indicates that the data of the associated cache line of the lower level cache memory 203 is not cached in the first level cache memory 202.

In this example, bits [15:8] of the memory line indexed by 0x0FF0 contain the L-bits that correspond to the eight cache lines of the lower level cache memory 203 indexed by 0x0FF0+0x2000. All of these L-bits are false except for L-bit 222 (bit [13] of the memory line), which corresponds with cache line 218 of the lower level cache memory 203. Cache line 218 contains data, inst-A, that is cached in the instruction cache memory 202A of the first level cache memory 202. In particular, inst-A is stored in the cache line of way set 207 of the instruction cache memory 202A indexed by 0x0FF0.

In accordance with the present invention, cache line 218 is protected and overwriting of the refill data (data-C) into that cache line is prohibited because the L-bit 222 is true. Thus, the refill data, data-C, is refilled into any of the other cache lines of the lower level cache memory 203 indexed by 0x0FF0+0x2000. By way of example, the refill data may be overwritten into the cache line of way set 212. Further, the refill data, data-C, is written into one of the cache lines of the data cache memory 202B of the first level cache memory 202 that is indexed by 0x0FF0, such as the cache line of way set 204. Thus, the data, data-B, that was previously stored in that cache line of way set 204 is overwritten with the refill data, data-C. Bit [11] of the memory line of the additional memory 203A indexed by 0x0FF0 is set true to indicate that the data of the corresponding cache line of way set 212 of the lower level cache memory 203 is cached in the first level cache memory 202. Since the cache line of way set 204 of the data cache memory 202B indexed by 0x0FF0 no longer contains data-B, a further modification to the L-bits of the additional memory 203A must be performed. In particular, a copy of data-B is stored in cache line 221 of way set 209 of the lower level cache memory 203. The cache line 221 is indexed by 0x0FF0+0x6000 and, thus, the corresponding L-bit 225 of that cache line must be updated. This L-bit 225 is located at bit [24] of the memory line of the additional memory 203A indexed by 0x0FF0. In particular, L-bit 225 is set from a true state (logic high) to a false state (logic low). It is noted that L-bits 222 and 225 are modified at the same time.

Advantageously, when the lower level cache memory 203 is refilled, there is no need to invalidate any data of the first level cache memory 202. Thus, improved memory efficiency, increased processing throughput, and improved quality of data processing are achieved.

Figure 4:
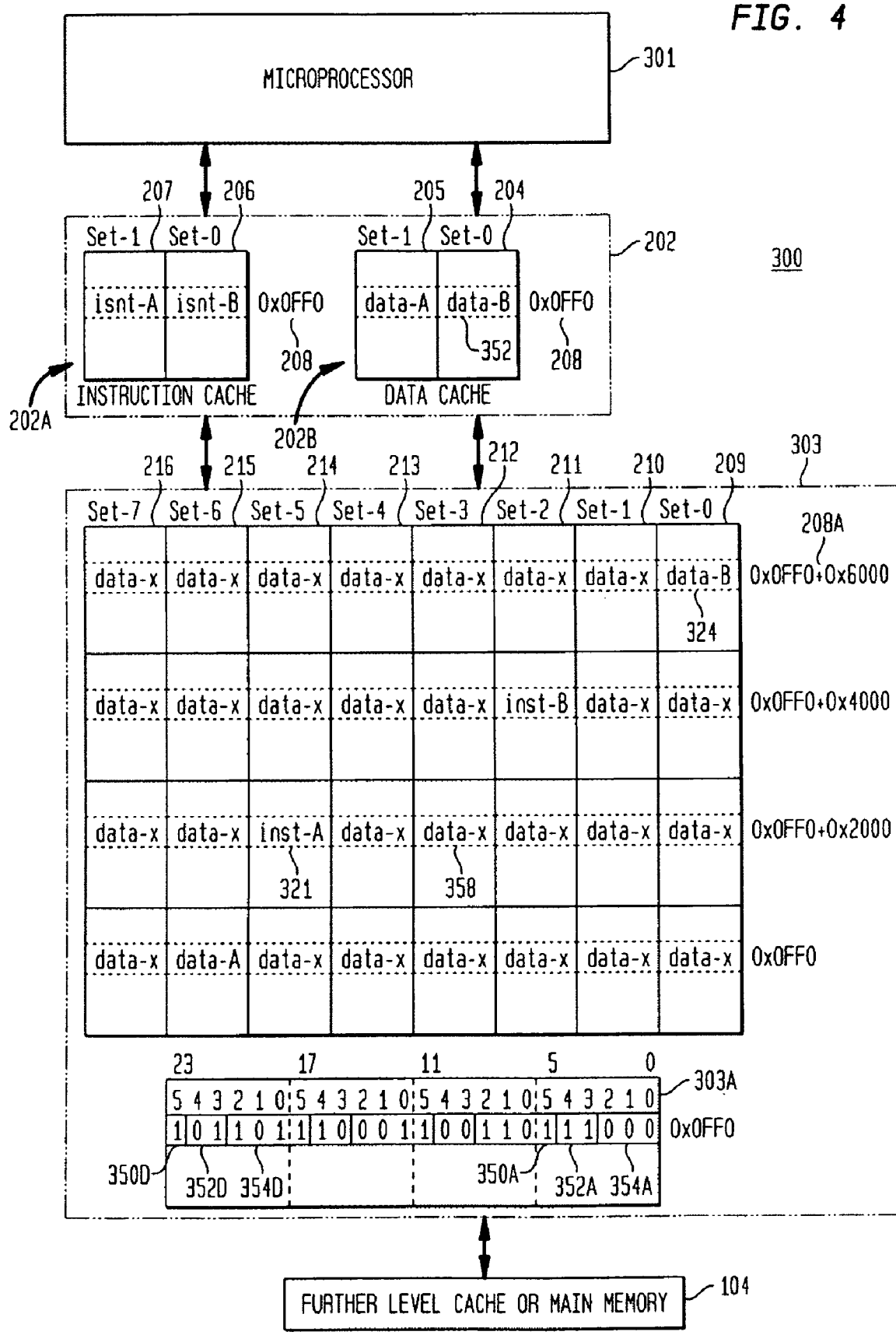
FIG. 4 is a block diagram showing further aspects of one or more methods and apparatus suitable for controlling a cache memory in accordance with one or more further embodiments of the present invention.

Reference is now made to FIG. 4, which is a block diagram illustrating further aspects and embodiments of the present invention. Again, for the purposes of brevity and clarity, the block diagram of FIG. 4 will be referred to, and described herein, as illustrating an apparatus 300. It is understood, however, that the description of FIG. 4 may be readily applied to various aspects of one or more methods with equal force.

The apparatus 300 preferably represents a microprocessor system including a microprocessor device 301, a first level cache memory 202, a next lower level cache memory 303, and a further memory 104. The first level cache memory 202 is preferably substantially similar to the first level cache memory 202 described hereinabove and illustrated in FIG. 3. Thus, the first level cache memory 202 preferably includes an instruction cache memory 202A and a separate data cache memory 202B, each being an N-way set associative cache memory implementation, where N=2. Each way set 204-207 of the first level cache memory 202 is preferably 8 K bytes in size, and each cache line thereof preferably is operable to store an address tag, status flags, and data (which may include instructions). Thus, the pointer 208 takes on values between 0x0000 and 0x1FFF (13 bits) to index every cache line of way sets 204-207. By way of illustration, the pointer 208 has a value of 0x0FF0 and points to one cache line of each way set 204-207.

The next lower level cache memory 303 is preferably substantially similar to the cache memory 203 discussed above and illustrated in FIG. 3, except for the additional memory 303A (which will be discussed in more detail later in this description). Thus, the lower level cache memory 303 is preferably an N-way set associative cache memory, where the memory includes eight way sets 209-216, which may also be referred herein as Set-0 through Set-7, respectively. Further, each way set 209-216 of the lower level cache memory 303 is preferably 32 K bytes in size, i.e., each way set 209-216 is four times larger than each way set 204-207 of the first level cache memory 202. Thus, the pointer 208A requires 15 bits ranging from 0x0000 to 0x7FFF in order to access every cache line of the next lower level cache memory 303.

As was the case with the apparatus 200 of FIG. 3, the pointer 208 of the first level cache memory 202 of FIG. 4 only requires 13 bits ranging from 0x0000 to 0x1FFF to access every cache line of the first level cache memory 202. The lower level cache memory 303, however, utilizes the lowest two bits of the tag bits of the effective address along with the 13 bits provided from the first level cache memory 202 as the index to obtain the fifteen index bits. Thus, the index into the cache lines of the lower level cache memory 303 is formed by augmenting the 13 index bits from the first level cache memory 202 with an index offset obtained by the additional two bits of the tag bits. In this example, the index offset may take on a value from among 0x0000, 0x2000, 0x4000, and 0x6000.

Each cache line of the lower level cache memory 303 is preferably operable to store an address tag, status flags, and data (which may include instructions). As with the cache memory 203 of FIG. 3, the lower level cache memory 303 of FIG. 4 preferably does not include an L-flag contained within each cache line thereof. Rather, the additional memory 303A, which may be integral with, or separate from, the lower level cache memory 303 includes such L-flags.

More particularly, the additional memory 303A preferably includes a plurality of memory lines, where the number of memory lines corresponds with the number of cache lines contained in each of the way sets 204-207 of the first level cache memory 202. Thus, in the example illustrated in FIG. 4, the additional memory 303A preferably includes 8 K memory lines. Each memory line of the additional memory 303A preferably includes respective groups of bits associated with each of the way sets 204-207 of the first level cache memory 202. Thus, each group of bits in each memory line of the additional memory 303A is associated with a respective one of the cache lines of the first level cache memory 202. Each group of bits preferably includes an L-flag 350, offset bits 352, and way set bits 354. As was the case in previous embodiments of the invention, the L-flag 350 is indicative of whether the associated cache line of the first level cache memory 202 contains a copy of the data stored in the given cache line of the lower level cache memory 303. In this embodiment of the invention, the given cache line associated with a particular L-flag 350 is pointed to by the index (provided by the first level cache memory 202) in combination with the index offset bits 352 and the way set bits 354 of that group. Thus, the cache line of the lower level cache memory 303 that is associated with a given group of bits of the additional memory 303A is determined by offsetting the index provided from the first level cache memory 202 by an amount corresponding to the index offset bits 352 (which provides a pointer to eight cache lines, one cache line of each way set 209-216) and selecting a particular way set 209-216 corresponding to the way set bits 354. In this example, the index offset bits 352 may take on any of four values, namely, 00 (corresponding to an index offset of 0x0000), 01 (corresponding to an index offset of 0x2000), 10 (corresponding to an index offset of 0x4000), and 11 (corresponding to an index offset of 0x6000). The way set bits 354 may take on one of eight values, namely, 000 (corresponding to Set-0), 001 (corresponding to Set-1), 010 (corresponding to Set-2), 01 (corresponding to Set-3), . . . and 111 (corresponding to Set-7).

Thus, each memory line of the additional memory 303A includes respective L-flags 350 for multiple cache lines of the lower level cache memory 303, i.e., those cache lines corresponding to the respective index, index offset bits 352, and way set bits 354 of the respective groups of bits. Further, each group of bits of each memory line of the additional memory 303A is associated with a given one of the way sets 204-207 of the first level cache memory 202. Given the number of way sets of the first level cache memory 202, the number of, and size of, the way sets of the lower level cache memory 303, and the size of each L-flag 350 (i.e., one bit), each memory line of the additional memory 303A includes 24 bits [23:0].

The operation of the apparatus 300 of FIG. 4 will now be described further by way of an example. The microprocessor 301 issues an effective address (or access request) to the first level cache memory 202 by way of, for example, a 32 bit address bus. For the purposes of this example, it is assumed that the microprocessor 301 requests data-C at an index of 0x0FF0. This data, data-C, is not stored in either of the first level cache memory 202 or the lower level cache memory 303. Bits [31:13] of the address bus thus contain tag bits corresponding to the data (data-C) requested by the microprocessor 301. Bits [12:0] of the address bus contain index bits, which are used to point to respective cache lines of the way sets 204-207 of the first level cache memory 202. In this example, the index bits are 0x0FF0 and, thus, the pointer 208 accesses two cache lines of the instruction cache memory 202A (containing inst-A and inst-B) and/or two cache lines of the data cache memory 202B (containing data-A and data-B). Since neither of the two accessed cache lines of the data cache memory 202B contain data-C, a cache miss occurs.

Due to the cache miss, the first level cache memory 202 passes the effective address to the lower level cache memory 303 such that an attempt may be made to satisfy the data access request in that cache memory. The next lower level cache memory 303 utilizes bits [14:0] of the address bus as containing the index bits of the effective address. For the purposes of this example, it is assumed that bits [14:13] of the address bus are 01, which corresponds to an index offset of 0x2000. Thus, the pointer 208A takes on a value of 0x0FF0+0x2000 and points to the corresponding eight cache lines from way sets 209-216 of the lower level cache memory 203.

Since none of the eight accessed cache lines of the lower level cache memory 303 contain data-C, a cache miss occurs. Thus, the lower level cache memory 303 passes the effective address to the further memory 104 (which may be one or more further cache memories and/or main memory). Thereafter, data-C are returned for refill into the respective cache memories 202, 303.

A determination is made as to which cache line (indexed by 0x0FF0+0x2000) of the lower level cache memory 303 is to receive the refill data, data-C. If one or more of these cache lines of the lower level cache memory 303 contains invalid data, then the refill data is preferably overwritten into one of such cache lines. In this example, however, it is assumed that each of these cache lines of the lower level cache memory 303 contains valid data. Thus, a determination is preferably made as to whether one or more of the cache lines contain data that are not cached in the first level cache memory 202 and, if so, the refill data are stored in one of those cache lines.

To achieve the above, the memory line of the additional memory 303A indexed by 0x0FF0 (with no offset) is accessed. This memory line, as is the case with all of the memory lines, contains four L-flags 350A-D, each of a single bit and corresponding to four cache lines of the lower level cache memory 303. A true bit (logic high) indicates that the data of the associated cache line of the lower level cache memory 303 is also cached in the first level cache memory 202. A false (logic low) level indicates that the data of the associate cache line of the lower level cache memory 303 is not cached in the first level cache memory 202.

In this example, only index offset bits 352D are 01, corresponding to an offset of 0x2000, which when utilized in combination with the index provided from the first level cache memory 202 and the way set bits 354D (corresponding to Set-5) indicate that the group of bits is associated with cache line 321 of the lower level cache memory 303. The L-bit 350D of that group of bits is true indicating that cache line 321 should not be overwritten with the refill data, data-C. On the other hand, any of the other cache lines of the lower level cache memory 303 indexed by 0x0FF0+0x2000, such as cache line 358, are available for refill.

The refill data, data-C, is written into one of the cache lines of the data cache memory 202B of the first level cache memory 202 that is indexed by 0x0FF0, such as the cache line 352 of way set 204. Thus, the data, data-B, that was previously stored in cache line 352 is overwritten with the refill data, data-C. Since the cache line 352 of way set 204 of the data cache memory 202B indexed by 0x0FF0 no longer contains data-B, a modification to one of the L-bits 350 of the additional memory 303A must be performed. In particular, a copy of data-B is stored in cache line 324 of way set 209 of the lower level cache memory 303. The cache line 324 is indexed by 0x0FF0+0x6000 and, thus, the corresponding L-bit 350A of cache line 324 must be updated. This L-bit 350A is located at bit [5] of the memory line of the additional memory 303A indexed by 0x0FF0. Indeed, L-bit 350A is grouped with index offset bits 352A and way set bits 354A of 11 and 000, respectively, i.e., pointing to cache line 324 of the lower level cache memory 303. In order to properly update the L-bit associated with the cache line 358 and 324, the index offset bits 352 and way set bits 354 associated with way set 104 of the first level cache memory 202 are updated. In particular, the index offset bits 352A are changed from 11 to 01 and the way set bits 354A are changed from 000 to 011, thereby associating that group of bits with cache line 358 instead of cache line 324 of the lower level cache memory 303.

Advantageously, when the lower level cache memory 303 is refilled, there is no need to invalidate any data of the first level cache memory 202. Thus, improved memory efficiency, increased processing throughput, and improved quality of data processing are achieved.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus, comprising:
a first level cache memory including a plurality of way sets and a plurality of cache lines associated therewith, each cache line of the first level cache memory being operable to store an address tag and data;
a next lower level cache memory including a plurality of way sets and a plurality of cache lines associated therewith, each cache line of the next lower level cache memory being operable to store an address tag, status flags, and data; and
an additional memory associated with the next lower level cache memory and including a plurality of memory lines, wherein the number of memory lines corresponds with the number of cache lines contained in a given way set of the first level cache memory, the additional memory being separate from the next lower level cache memory;
wherein each cache line of the first level cache memory has an index associated therewith, each memory line of the additional memory includes respective L-flags for multiple cache lines of each way set of the next lower level cache memory, all L-flags associated with a given one of the indices plus any index offset from the first level cache memory are contained in a single memory line of the additional memory, and the next lower level cache memory does not include an L-flag contained within each cache line thereof.

2. The apparatus of claim 1, wherein the plurality of cache lines of the first level cache memory are addressed by way of effective addresses.

3. The apparatus of claim 2, wherein the effective addresses are issued by a microprocessor controlling operation of the apparatus.

4. The apparatus of claim 2, where each effective address for a respective one of the cache lines of the first level cache memory includes a tag and the respective index.

5. The apparatus of claim 4, wherein the respective index provides a pointer to a particular cache line of the first level cache memory.

6. The apparatus of claim 5, wherein when a cache miss occurs in the first level cache memory, a respective effective address is passed to the next lower level cache memory over an address bus, a first set of bits in the address bus containing the tag of the respective effective address and a second set of bits in the address bus containing the index of the respective effective address.

7. The apparatus of claim 1, wherein states of the respective L-flags are controlled as a function of the data stored in the first level cache memory.

8. An apparatus, comprising:
a first level cache memory including a plurality of way sets and a plurality of cache lines associated therewith, each cache line of the first level cache memory being operable to store an address tag and data;
a next lower level cache memory including a plurality of way sets and a plurality of cache lines associated therewith, each cache line of the next lower level cache memory being operable to store an address tag, status flags, and data; and
an additional memory associated with the next lower level cache memory and including a plurality of memory lines, wherein the number of memory lines corresponds with the number of cache lines contained in a given way set of the first level cache memory;
wherein each cache line of the first level cache memory has an index associated therewith, each memory line of the additional memory includes respective L-flags for multiple cache lines of each way set of the next lower level cache memory, and all L-flags associated with a given one of the indices plus any index offset from the first level cache memory are contained in a single memory line of the additional memory so that all of the L-flags associated with the given index plus any index offset are controlled at the same time.

9. The apparatus of claim 8, wherein the plurality of cache lines of the first level cache memory are addressed by way of effective addresses.

10. The apparatus of claim 9, wherein the effective addresses are issued by a microprocessor controlling operation of the apparatus.

11. The apparatus of claim 9, where each effective address for a respective one of the cache lines of the first level cache memory includes a tag and the respective index.

12. The apparatus of claim 11, wherein the respective index provides a pointer to a particular cache line of the first level cache memory.

13. The apparatus of claim 12, wherein when a cache miss occurs in the first level cache memory, a respective effective address is passed to the next lower level cache memory over an address bus, a first set of bits in the address bus containing the tag of the respective effective address and a second set of bits in the address bus containing the index of the respective effective address.

14. The apparatus of claim 8, wherein states of the respective L-flags are controlled as a function of the data stored in the first level cache memory.

15. An apparatus, comprising:
- a first level cache memory including a plurality of way sets and a plurality of cache lines associated therewith, each cache line of the first level cache memory being operable to store an address tag and data;
- a next lower level cache memory including a plurality of way sets and a plurality of cache lines associated therewith, each cache line of the next lower level cache memory being operable to store an address tag, status flags, and data; and
- an additional memory associated with the next lower level cache memory and including a plurality of memory lines, wherein the number of memory lines corresponds with the number of cache lines contained in a given way set of the first level cache memory;
- wherein each cache line of the first level cache memory has an index associated therewith, each memory line of the additional memory includes respective L-flags for multiple cache lines of each way set of the next lower level cache memory, all L-flags associated with a given one of the indices plus any index offset from the first level cache memory are contained in a single memory line of the additional memory, and when the next lower level cache memory is refilled, data of the first level cache memory is not invalidated.

16. The apparatus of claim 15, wherein the plurality of cache lines of the first level cache memory are addressed by way of effective addresses.

17. The apparatus of claim 16, where each effective address for a respective one of the cache lines of the first level cache memory includes a tag and the respective index.

18. The apparatus of claim 17, wherein the respective index provides a pointer to a particular cache line of the first level cache memory.

19. The apparatus of claim 18, wherein when a cache miss occurs in the first level cache memory, a respective effective address is passed to the next lower level cache memory over an address bus, a first set of bits in the address bus containing the tag of the respective effective address and a second set of bits in the address bus containing the index of the respective effective address.

20. The apparatus of claim 15, wherein states of the respective L-flags are controlled as a function of the data stored in the first level cache memory.

21. The apparatus of claim 15, wherein if writing to a given cache line of the next lower level cache memory is prohibited due to the status of a respective L-flag associated with the given cache line, than refill data is refilled into any of the other cache lines of the next lower level cache memory indexed by the same index and index offset.

* * * * *